Patented Sept. 2, 1924.

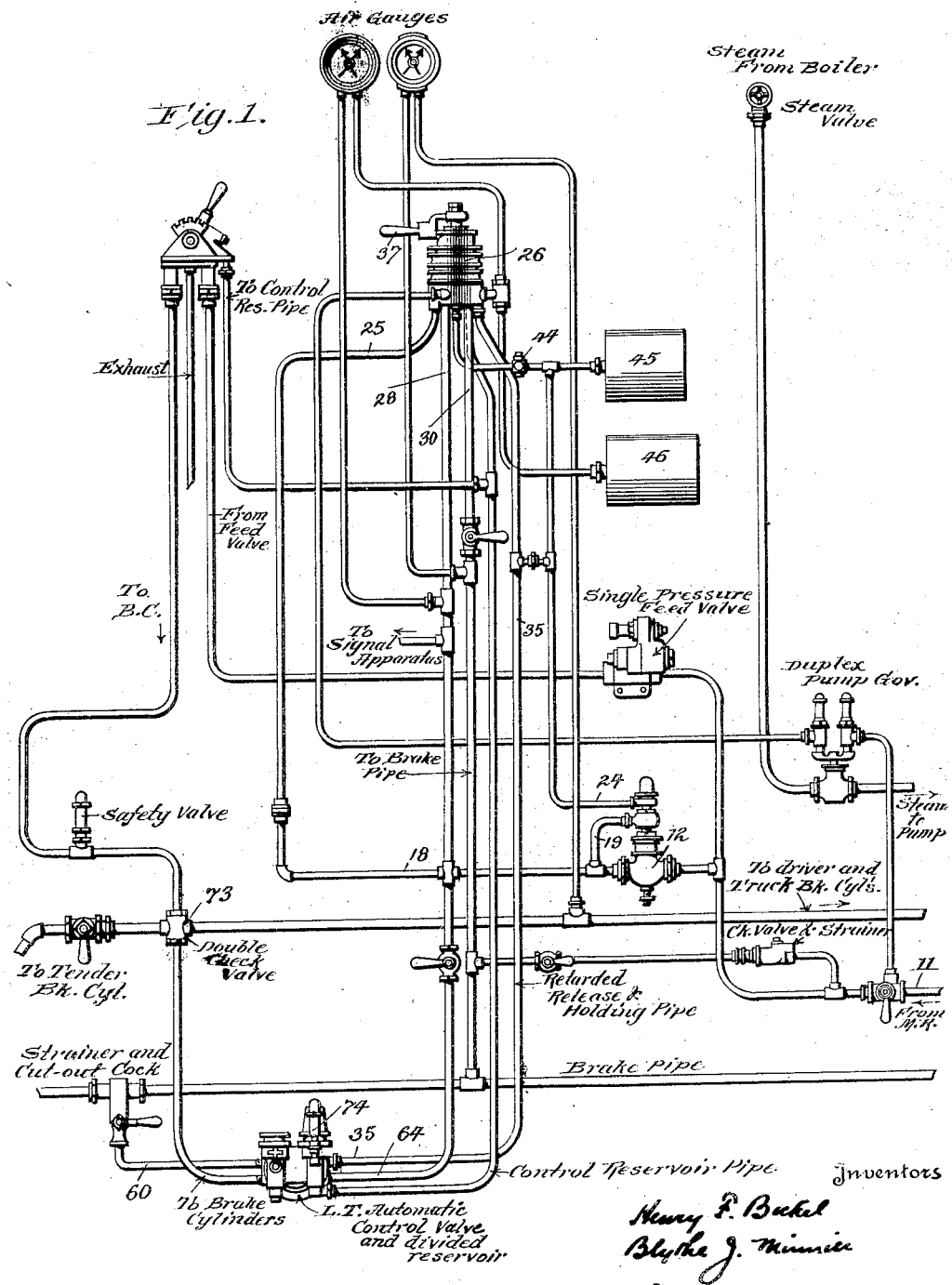

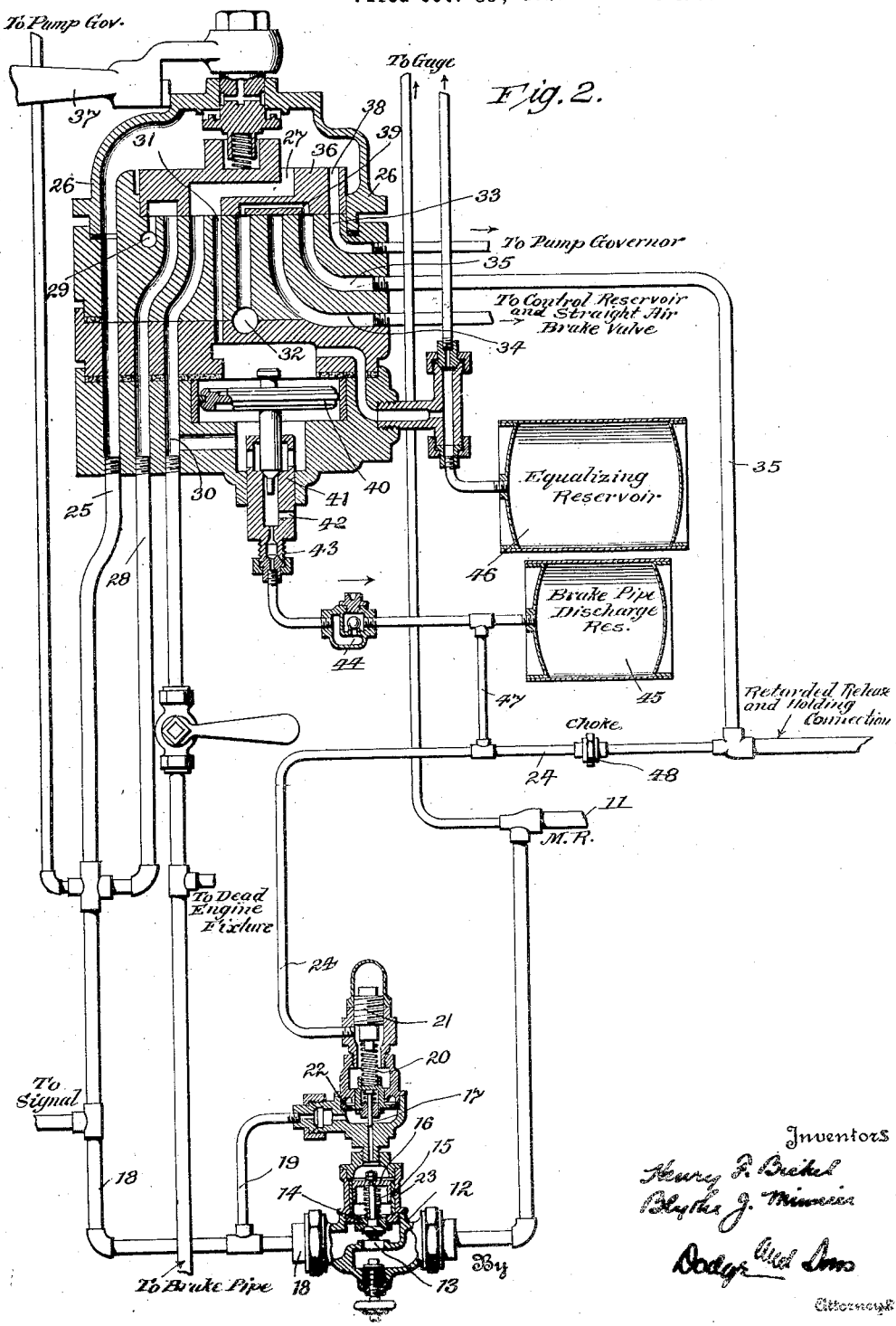

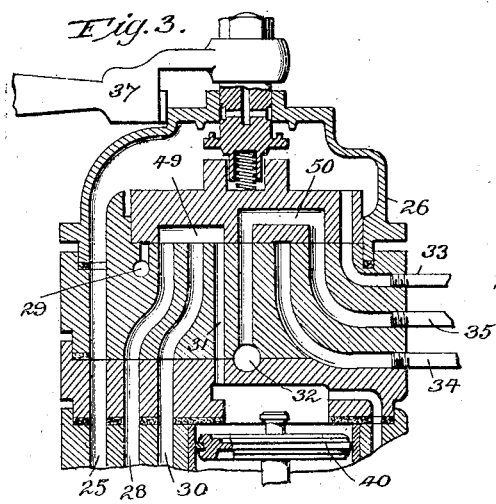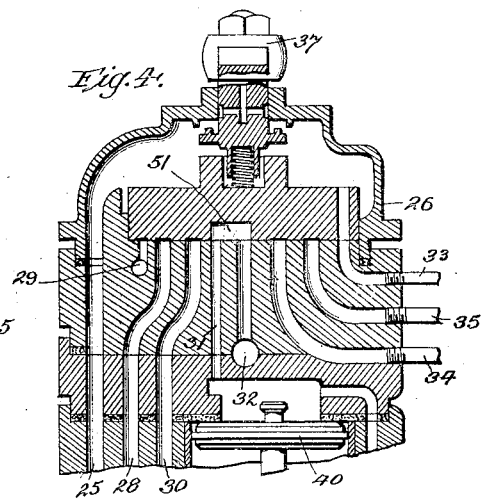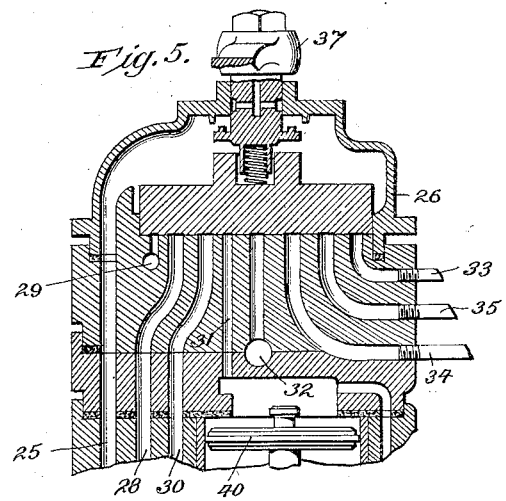

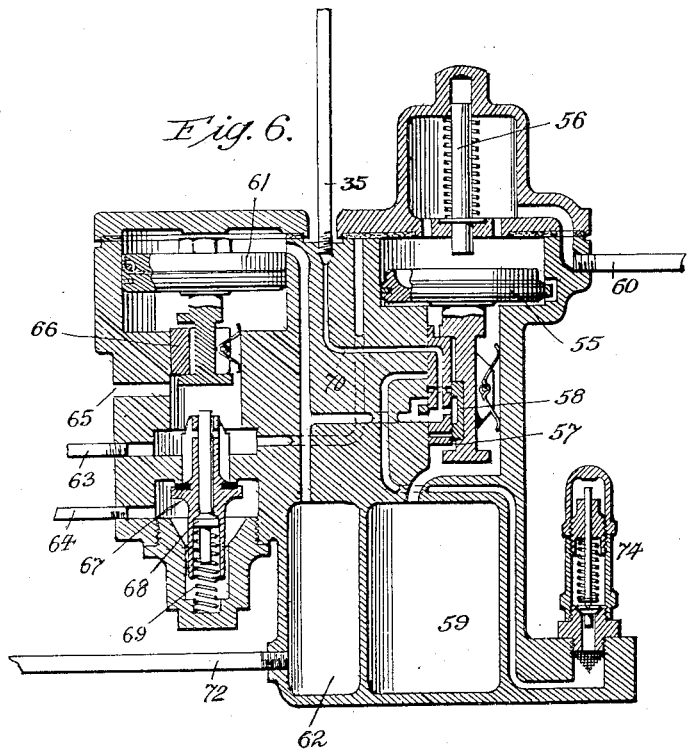

1,506,808

UNITED STATES PATENT OFFICE.

HENRY F. BICKEL, OF PLAINFIELD, NEW JERSEY, AND BLYTHE J. MINNIER, OF WATERTOWN, NEW YORK, ASSIGNORS TO THE NEW YORK AIR BRAKE COMPANY, A CORPORATION OF NEW YORK.

AIR BRAKE.

Application filed October 30, 1922. Serial No. 597,967.

*To all whom it may concern:*

Be it known that we, HENRY F. BICKEL and BLYTHE J. MINNIER, citizens of the United States, residing, respectively, at Plainfield, in the county of Union and State of New Jersey, and at Watertown, in the county of Jefferson and State of New York, have invented certain new and useful Improvements in Air Brakes, of which the following is a specification.

This invention relates to apparatus for automatically controlling the brake releasing function of automatic air brake equipment.

The apparatus operates according to the method described and claimed in my prior application, Serial No. 573,326, filed July 7, 1922, and may be incorporated in standard automatic air brake systems of the type including auxiliary reservoirs and triple valves.

In air brake systems of this type, it is the practice to carry in the main reservoir a pressure higher than that maintained in the brake pipe. This relatively high main reservoir pressure offers a reserve of compressed air which is available to insure prompt movement of all the triple valves from application position, or from lap position, to release-and-recharge position.

In order to permit the engineer to control the admission of main reservoir pressure to the brake pipe, the engineer's brake valve is so constructed that it feeds air to the brake pipe at different rates in two different positions, one of which is known as "release position" and the other as "running position." In release position, main reservoir air is fed, without pressure reduction, from the main reservoir through the brake valve to the brake pipe, and this position is used to release the brakes and start the recharge of the auxiliary reservoirs. In running position, the main reservoir is connected to the brake pipe through the engineer's valve in such a way that a pressure reducing feed valve is interposed, and this valve operates to control the feed of air to the brake pipe, so that the desired brake pipe pressure is maintained but is not exceeded.

After a brake application has been made, the brakes are released by moving the engineer's brake valve first to release position and later to running position. The correct manipulation is to leave the valve in release position only long enough to insure the movement of all triple valves to release-and-recharge position. If it is left in release position too long, the reservoirs and brake pipe near the front of the train will be charged to too high a pressure so that, when the valve is moved back to running position, an undesired reapplication of the brakes on the front portion of the train will occur.

The time necessary to effect the movement of all the triple valves to release position is dependent on the length of the train and the intensity of the preceding brake application, i. e., on brake pipe volume and the reduction of brake pipe pressure, so that it requires the exercise of considerable discretion on the part of the engineer to estimate the time that the engineer's brake valve should be left in release position. This difficulty is greatly increased in modern equipment by the very long trains customarily used. The great variations in train length encountered require exercise of considerable forethought and judgment, while the use of exceedingly sensitive apparatus for the purpose of securing rapid serial application in long trains increases the tendency for reapplications to occur.

The present invention provides automatic means for limiting the duration of the release function of the engineer's brake valve, i. e., the unrestricted feed of main reservoir air to the brake pipe, to correspond with the length of the train and the intensity of the application which is to be released.

The invention is based on a recognition of the fact that the amount of air discharged through the equalizing discharge valve forming a part of the engineer's brake valve is a function of the length of the train and of the intensity of the application which results from such discharge. The operation involves the measurement or approximate measurement of the air discharged through the equalizing discharge valve, and, during the ensuing release function, the automatic imposition of a corresponding time limit on the feed of air at main reservoir pressure to the brake pipe, The simplest way of measuring the air discharged through the equalizing discharge valve is to impound this air or a proportional part thereof, under moderate pressure. This air is thereafter released through a restricted port in the release position of the engineer's valve, and the duration of outflow of this air is used to determine the duration of free flow of air from the main reservoir to the brake pipe.

The preferred manner of modifying the existing air brake equipment to incorporate the present invention is to eliminate the pressure feed valve customarily used to feed air from the main reservoir to the brake pipe in running position of the engineer's valve, and to substitute therefor a pressure controlling valve equipped with pressure controlled means for holding it out of action. This pressure controlling valve is connected on its inlet side with the main reservoir and on its discharge side both to the feed valve connection and to the main reservoir connection of the engineer's brake valve. Consequently, the only communication from the main reservoir to the engineer's brake valve is through this pressure controlling valve.

The equalizing discharge valve of the engineer's brake valve is provided with a special discharge fitting having a restricted port leading to the atmosphere, and between the equalizing discharge valve and this restricted port a passage leads through a check valve to a small reservoir which we call the "brake pipe discharge reservoir." This reservoir is connected by a restricted port or choke to a port in the seat of the rotary valve of the engineer's brake valve and this port is open to atmosphere in the release and running positions of the engineer's brake valve. This port may conveniently be, but is not necessarily, a port also controlling the holding pipe connection used with the so-called "L. T." (locomotive and tender) equipment and may be arranged to offer a retarded release of the locomotive and tender brakes in release position and a quick release thereof in running position.

The brake pipe discharge reservoir is also connected to the pressure controlling valve in such manner that the existence of pressure in the reservoir so affects the pressure controlling valve as to hold this valve fully open.

Thus the reservoir is charged in service applications to a pressure dependent on the length of the train and the brake pipe pressure reduction. In release the air slowly escapes through the ports above mentioned and until it has escaped the pressure controlling valve is inoperative. The time of such escape varies according to the initial pressure in the reservoir and hence a proper time factor may be imposed on free flow from the main reservoir to the brake pipe, by properly proportioning the restricted escaped port or choke.

In the accompanying drawings is illustrated a preferred form of apparatus embodying the invention.

Fig. 1 is a general view of the equipment carried on a locomotive, showing the important connections between the engineer's brake valve, main reservoir, brake pipe, L. T. equipment and straight air valve.

Fig. 2 is a sectional view showing the engineer's brake valve in release position and connected up with the special exhaust fitting, check valve, brake pipe discharge reservoir, choke port and pressure controlling valve. In this view the engineer's brake valve is not shown as actually constructed, but is diagrammed in the conventional manner familiar to those skilled in the art.

Fig. 3 is a fragmentary view, similar to Fig. 1, showing the engineer's brake valve in running position.

Fig. 4 is a similar view showing the engineer's brake valve in service position.

Fig. 5 is a similar view showing the engineer's brake valve in lap position.

Fig. 6 is a sectional view, largely diagrammatic, showing the L. T. equipment in release position.

Air from the main reservoir is received through a pipe 11 and is delivered thereby to the inlet side of the pressure control valve 12. This valve is of a form familiar in the art. It is provided with a valve seat 13 and a valve member 14 which is urged away from the seat by a coil spring 15, and which may be forced to its seat by pressure acting on the upper side of a piston 16. Pressure is admitted to act against the upper side of the piston 16 through a needle valve 17. This needle valve receives pressure fluid from the discharge connection 18 of the valve 12 through a pipe connection 19. The valve 17 is urged to its seat by a spring 20 which is adjustable by means of the threaded plug 21. The valve 17 is urged in an opening direction by the pressure fluid entering through the pipe 19 and acting on the lower face of a diaphragm 22.

Consequently, the pressure in the pipe 18 acts through the pipe 19 against the lower face of the diaphragm 22. This results in opening the valve 17 and admitting pressure fluid to act on the upper face of the piston 16, thus urging the valve 14 toward its closed position. The space above the piston 16 is vented through a restricted orifice, indicated at 23, and the device as a whole functions to maintain a substantially constant pressure in the pipe 18, and this pressure is determined by the adjustment of spring 20 by plug 21. As stated, valves of this general type are known to those skilled in the art.

In order to suspend the regulating function of the valve 12, a connection 24 is provided which serves to admit pressure fluid at certain times to act against the upper side of the diaphragm 22 and thus reinforce the action of the spring 20. At such times, the valve 17 is held closed and, since the space above the piston 16 is vented, the valve member 14 remains in its upper position away from the seat 13. Consequently, the pressure reducing function of the pressure control valve 12 is suspended.

Pressure control valve 12, unlike the feed valve customarily used in air brake systems, controls the feed of air both to the main air connection and to the feed connection of the engineer's brake valve. Consequently, the pipe 18 is connected to the main air connection 25 and to the feed valve connection 28 of the engineer's brake valve 26.

Other ports visible in Fig. 2 are the warning port 29 which is open in release position, the brake pipe port 30, the equalizing cylinder port 31, exhaust port 32, pump governor port 33, the control reservoir port 34 and the holding pipe port 35.

In release position, the rotary valve 36, operated by the handle 37, establishes communication from the main air connection (i. e. from the space above the rotary valve) to the brake pipe and to the pump governor by means of the ports 27 and 38 at the same time the port 39 establishes a restricted connection between the holding pipe 35 and the exhaust port 32. Consequently, in this position the locomotive and tender brakes are undergoing a retarded release due to the escape of air from the holding pipe 35 to exhaust. This is incident to the operation of the L. T. equipment hereinafter more fully described in connection with Fig. 6.

The equalizing discharge piston and its cylinder are indicated generally at 40 and the equalizing discharge valve at 41. This valve is supplied with a special fitting formed with a lateral exhaust port 42 which is relatively restricted, and a second restricted connection 43 which leads to a check valve 44 and thence to a closed reservoir 45 which we call the brake pipe discharge reservoir. The equalizing reservoir is shown at 46 and is of usual construction. Leading from the brake pipe discharge reservoir, there is a direct connection by means of the pipe 47 to the pipe 24, which is connected as already described, to admit pressure fluid against the upper side of the diaphragm 22. The pipes 47 and 24 are both connected through a choke or restricted port 48 to the holding pipe 35.

In Fig. 3, which shows the device in running position, the feed valve connection and the brake pipe connection are placed in direct communication by means of the port 49 in the rotary valve. At the same time the holding pipe 35 is placed in direct and free communication with the exhaust port 32 by means of the port 50 also formed in the rotary valve.

In Fig. 4, which shows the service position, the equalizing chamber is connected to exhaust by means of the port 51 in the rotary valve, while, in Fig. 5, which shows lap position, all ports are blanked. It should be observed in this connection that the valve structure above described departs from former standard practice to the extent that the port 39 provides for retarded release of the engine and tender brakes in release position, and the port 50 provides for quick release of the engine and tender brakes in running position. This arrangement makes it conveniently possible to vent the brake pipe discharge reservoir through the holding pipe 35.

The engineer's valve has also a "holding" position and an "emergency" position, neither of which is illustrated and each of which conforms in structure and function with standard practice. They are not illustrated because neither directly affects the method here involved.

In Fig. 1, we have shown the apparatus so far described as it appears when connected in an air brake system of conventional form, and we have indicated most of the standard apparatus forming part of the well known New York air brake system by means of legends. The parts illustrated in Figs. 2 to 5 inclusive are indicated by the reference numerals heretofore used so far as these parts are visible in Fig. 1. The purpose of Fig. 1 is to indicate to those skilled in the art how the connections to the straight air brakes, the gages, the pump governor, the locomotive and tender equipment and the like are made, and, inasmuch as the installation conforms to standard practice, except as is described in detail above, no detailed discussion of Fig. 1 appears necessary.

The L. T. equipment conforms to standard practice, but, in order that the various functions of the complete system may be fully explained, the general structure of the L. T. equipment will now be described with reference to Fig. 6. This figure illustrates in conventional diagram the L. T. equipment constructed by the New York Air Brake Company, and familiar to those skilled in the art.

The triple piston is shown at 55, the graduating stem at 56, the triple valve at 57, the graduating valve at 58 and the auxiliary reservoir at 59. The brake pipe is connected at 60 so that the triple piston operates in the usual manner, under the influence of changes of pressure in the brake pipe, to charge the auxiliary reservoir, to admit pressure from the auxiliary reservoir 59 against the rear face of the control piston 61, and to exhaust such pressure fluid. The space behind the control piston 61 is increased in volume by the control reservoir 62, connected therewith, and the control piston acts to create in the brake cylinder, and to maintain in the brake cylinder, the pressure established behind the control piston 61 by the action of the triple valve 57.

These functions it performs through the following instrumentalities. The brake cylinder is connected at 63 and the main reservoir at 64, while 65 is an exhaust port. The port 65 is controlled by a slide valve 66 operated directly by the control piston. The valve 67, normally held closed by main reservoir pressure, controls the flow of main reservoir air to the brake cylinder. In order to facilitate the opening of the valve 67 and to produce a graduated opening, this valve is provided with a secondary valve 68 mounted within the valve 67 and held closed by a spring 69. The stem of the valve 68 extends beyond the stem of the valve 67. When the control piston 61 is forced inward, its stem first strikes and opens the valve 68 and thereafter engages and opens the valve 67 if the motion of the control piston 61 be sufficient.

The retarded release and holding pipe 35 is connected to the exhaust port 70 controlled by the triple valve 57 and hence places the release of the engine and tender brakes under direct control by the engineer's brake valve. In "holding position" the locomotive and tender brakes are retained, while as already explained a free release is given in running position and a retarded release in release position.

The control pipe is connected at 72 to the control reservoir and the release of pressure through this pipe is effected when desired by means of the independent release valve combined with the straight air brake valve as is usual. The straight air brake valve may operate the engine brakes independently of the L. T. equipment, the usual double check valve indicated at 73 in Fig. 1 being used to allow the straight air equipment and the automatic equipment to operate the same brake cylinders without interference with each other. This arrangement is familiar to those skilled in the art. The brake cylinder pressure is limited by the adjustment of the safety valve 74.

What is claimed is:—

1. The combination with an automatic air brake system including a main reservoir, a brake pipe, an engineer's valve and a pressure reducing feed valve, the engineer's valve serving to control the discharge of the air from the brake pipe, and the feed valve and the engineer's valve serving conjointly to control feed of air from the main reservoir to the brake pipe alternatively with and without pressure reduction; of a mechanism operatively associated with said engineer's valve and said feed valve and conditioned by the release of air from the engineer's valve in applying the brakes, and proportionately to the quantity of air so released, to impose a corresponding time limit on the feed of air without pressure reduction to the brake pipe during the subsequent release of said application.

2. In an automatic air brake system, the combination of an engineer's brake valve and a feed valve operatively associated with each other to control the feed of air from the main reservoir to the brake pipe at two characteristically different pressures; and a mechanism actuated by the discharge of air from the brake pipe through the engineer's brake valve when applying the brakes and serving during the succeeding releasing function to limit the time duration of the high pressure feed rate.

3. In an automatic air brake system, the combination of an engineer's brake valve and a feed valve arranged to feed air to the brake pipe through the engineer's brake valve at two characteristically different rates; pressure operated means for permitting said valves to feed at the higher of said rates; means serving to accumulate progressively from the air discharged from the engineer's brake valve during its brake applying function, confined pressure fluid acting on said pressure operated means; and means controlled by the engineer's brake valve for gradually releasing said pressure fluid during the releasing function of the engineer's brake valve.

4. The combination of an engineer's brake valve including a valve for discharging air from the brake pipe to effect an application of the brakes and having a restricted discharge port beyond said valve; a reservoir connected between said valve and said discharge port whereby a portion of the air discharged by said valve is confined in said reservoir; means controlled by said engineer's brake valve in its brake releasing position for gradually venting air from said reservoir; a feed valve operatively associated with said engineer's brake valve and serving in conjunction therewith to feed air to the brake pipe alternatively at two pressures; and a mechanism conditioned by the existence of pressure in said reservoir to cause such feed to occur at such higher pressure.

5. The combination of an engineer's brake valve having an equalizing discharge valve provided with a restricted discharge port beyond said valve; a reservoir connected between said restricted discharge port and said equalizing discharge valve; means including a restricted port open in the brake release position of the engineer's brake valve for slowly venting air from said reservoir; a feed valve connected to feed pressure fluid at reduced pressure from a high pressure source to the brake pipe, under the control of the engineer's brake valve; and a mechanism subject to the pressure in said reservoir operatively connected with said feed valve and serving when subjected to substantial pressure to suspend the pressure reducing function of said feed valve.

6. The combination of an engineer's brake valve of the equalizing discharge type provided with a restricted discharge port located beyond the equalizing discharge valve; a brake pipe discharge reservoir connected to said engineer's brake valve at a point between said equalizing discharge valve and said restricted discharge port; a main reservoir; a pressure reducing feed valve serving to feed main reservoir air to the brake pipe in release and running positions of said engineer's brake valve; a mechanism subject to the pressure in said brake pipe discharge reservoir and serving when under substantial pressure to suspend the pressure reducing function of said feed valve; an automatic locomotive and tender brake equipment serving to apply the brakes by pressure fluid derived from the main reservoir and including a retarded release and holding connection to the engineer's brake valve; a restricted connection between said brake pipe discharge reservoir and said retarded release and holding pipe; and means including ports in the engineer's brake valve serving to discharge air from said retarded release and holding pipe at a restricted rate, in the release position of the engineer's brake valve, and at a higher rate in the running position of the engineer's brake valve.

7. In an automatic air brake system, the combination of an engineer's brake valve including a valve for discharging air from the brake pipe to effect an application of the brakes, and having a restricted discharge port beyond said valve; a reservoir connected between said valve and said discharge port, whereby a part of the air discharged by said valve is confined in said reservoir; means controlled by said engineer's brake valve in its brake releasing position for gradually venting air from said reservoir; a valve controlling the feed of air to the brake pipe; a valve actuating piston connected to move said valve in a closing direction when said piston is under pressure; and a valve structure including a spring and an abutment, the valve being arranged to be urged closed by the spring and by pressure in said reservoir acting on said abutment, and urged open by pressure in said brake pipe acting on said abutment, said valve, when open, serving to admit pressure fluid to act on said feed valve actuating piston.

In testimony whereof we have signed our names to this specification.

HENRY F. BICKEL.
BLYTHE J. MINNIER.